Feb. 24, 1931.                R. BOSMAN                1,794,275
                        FLESH SCRAPING IMPLEMENT
                          Filed March 12, 1930

Inventor
Russell Bosman

By Clarence A. O'Brien
                    Attorney

Patented Feb. 24, 1931

1,794,275

UNITED STATES PATENT OFFICE

RUSSELL BOSMAN, OF KANKAKEE, ILLINOIS

FLESH-SCRAPING IMPLEMENT

Application filed March 12, 1930. Serial No. 435,223.

This invention relates to an improved and simple form of scraping implement which is expressly designed for severing and removing flesh from animal pelts.

The invention has more particular reference to a hand manipulated appliance having an adjustably mounted substantially blunt scraping blade and an appropriate handle wherein said parts are so arranged as to permit the operator to conveniently hold the blade at a desirable angle with respect to the flesh on a stretched pelt for removing the flesh therefrom to facilitate subsequent conditioning and tanning.

Briefly stated, the implement comprises an elongated block-like handle having one end portion notched to accommodate an adjustable metallic scraping blade, the working end of the implement and blade being bevelled at an appropriate angle to facilitate expeditious handling.

Figure 1:
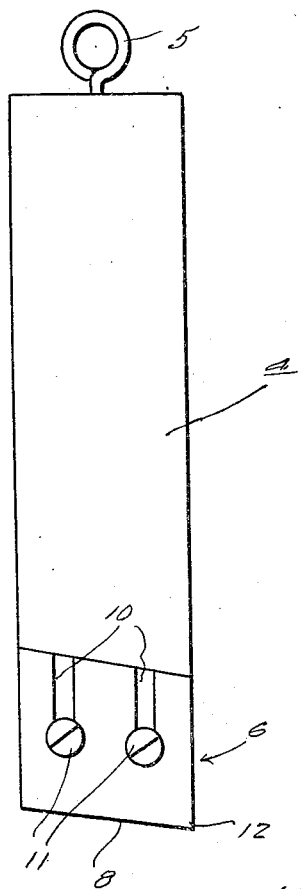
Figure 1 is an elevational view of an implement constructed in accordance with the present invention.
Figure 2:
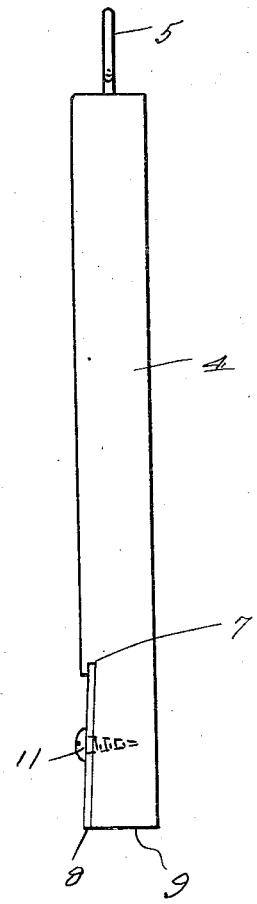
Figure 2 is an edge view of the same.
Figure 3:
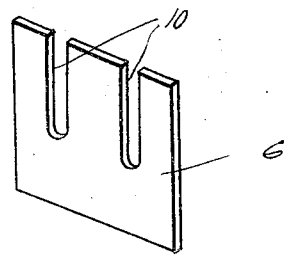
Figure 3 is a perspective view of the scraping blade.

In the drawings, the block-like handle which may be of wood or other suitable material is designated by the numeral 4. The configuration may be varied to facilitate convenient grasping and manipulation. At one end is a suspension eye 5 which may be used to suspend the tool from a nail or the like when not in use. The opposite end portion, which is bevelled, is notched out on one side to accommodate the metallic blade 6. Then too, the cutaway portion is formed with a groove as at 7 to accommodate the adjacent edge of the blade.

Incidentally, the blade is preferably proportioned so that the effective or working edge 8 is disposed substantially flush with the adjacent end 9 of the handle. It is desirable however, to form this blade with adjusting slots 10 which are cooperable with retaining screws 11 to permit the blade to be adjusted slightly or to be removed for sharpening or replacement.

The co-acting bevelled edges 8 and 9 form an appropriately located corner portion as at 12. It is a matter of common knowledge that in conditioning animal pelts such as for instance, muskrats and the like, it is customary to stretch the skin on a well known type of frame. Hence, in construing this invention it is to be understood that in using the scraping tool the skin is tautly stretched on the frame.

In using the implement or tool, it is held preferably with the right hand and with the heel portion 12 of the metal cutting plate facing the operator and a little crosswise on the pelt. The stretching frame (not shown) on the pelt, is held down on a table, or the like, or simply held in the lap of the operator. With the cutting blade facing the operator, the tool is moved longitudinally of the frame in a direction away from the operator in a manner to work the flesh towards the sides of the frame, always bearing down a little more on the heel of the cutting plate with the bevel perfectly flat on the pelt while doing this.

Experience in handling the implement however, will enable the user to determine the proper and most expeditious way of utilizing it.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

As a new product of manufacture, a flesh removing implement of the class described comprising a handle having the working end bevelled in the direction transverse to the longitudinal axis, and a detachable and adjustable metallic scraping blade mounted thereon and having its cutting edge disposed in substantially flush relation with said working end.

In testimony whereof I affix my signature.

RUSSELL BOSMAN.